United States Patent
Zhu et al.

(10) Patent No.: US 10,467,359 B2
(45) Date of Patent: Nov. 5, 2019

(54) SPECIAL-PURPOSE PROGRAMMED COMPUTER FOR NUMERICAL SIMULATION OF A METAL FORMING PROCESS HAVING A PREDEFINED LOAD PATH WITH CORRESPONDING MESH ADJUSTMENT SCHEME

(71) Applicant: Livermore Software Technology Corporation, Livermore, CA (US)

(72) Inventors: Xinhai Zhu, Pleasanton, CA (US); Houfu Fan, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 352 days.

(21) Appl. No.: 15/673,655

(22) Filed: Aug. 10, 2017

(65) Prior Publication Data
US 2019/0050504 A1   Feb. 14, 2019

(51) Int. Cl.
*G06F 17/50* (2006.01)
(52) U.S. Cl.
CPC ...... *G06F 17/5009* (2013.01); *G06F 17/5018* (2013.01); *G06F 17/5031* (2013.01); *G06F 17/5095* (2013.01); *G06F 2217/12* (2013.01); *G06F 2217/16* (2013.01); *G06F 2217/41* (2013.01); *G06F 2217/42* (2013.01)
(58) Field of Classification Search
None
See application file for complete search history.

(56) References Cited

U.S. PATENT DOCUMENTS

| | | | | |
|---|---|---|---|---|
| 7,167,816 B1 * | 1/2007 | Olovsson | ............ | G06F 17/5018 700/98 |
| 9,430,594 B2 * | 8/2016 | Zhu | ...................... | G06F 17/5018 |
| 2007/0244676 A1 * | 10/2007 | Shang | ................. | G06F 17/5018 703/2 |
| 2009/0299702 A1 * | 12/2009 | Grimes | ............... | G06F 17/5018 703/1 |
| 2011/0295570 A1 * | 12/2011 | Zhu | ...................... | G06F 17/5018 703/2 |
| 2015/0039273 A1 * | 2/2015 | Zhu | ...................... | G06F 17/5018 703/2 |

(Continued)

*Primary Examiner* — Kibrom K Gebresilassie
(74) *Attorney, Agent, or Firm* — Roger H Chu

(57) ABSTRACT

Numerically-simulated physical behaviors of workpiece sheet metal during a metal forming process having a predefined load path is obtained based on received FEA mesh model and mesh adjustment criteria as follows: initializing current simulation time; determining current simulation period from current simulation time and next mesh adjustment time; using characteristic length to establish a 3-D mesh refinement zone that contains a space encompassing a corresponding section of the predefined load path for the current simulation period; updating the FEA mesh model by refining those finite elements located within the 3-D mesh refinement zone to a desired level and by coarsening certain finite elements outside of the zone according to mesh coarsening criterion; conducting corresponding portion of the time-marching simulation using the updated FEA mesh model for current simulation period until current simulation time reaches next mesh adjustment time; and repeating until current simulation time passes the total simulation time period.

18 Claims, 15 Drawing Sheets

(56) References Cited

U.S. PATENT DOCUMENTS

| | | | |
|---|---|---|---|
| 2015/0347650 A1* | 12/2015 | Hallquist | G06F 17/5018 703/2 |
| 2016/0210385 A1* | 7/2016 | Zhu | G06F 17/5018 |
| 2016/0266319 A1* | 9/2016 | Grudinin | G02B 6/29341 |
| 2018/0067468 A1* | 3/2018 | Zhu | G05B 19/402 |
| 2018/0285502 A1* | 10/2018 | Hallquist | G06F 17/5018 |

* cited by examiner

SPECIAL-PURPOSE PROGRAMMED COMPUTER FOR NUMERICAL SIMULATION OF A METAL FORMING PROCESS HAVING A PREDEFINED LOAD PATH WITH CORRESPONDING MESH ADJUSTMENT SCHEME

FIELD

The invention generally relates to computer aided engineering analysis for simulating sheet metal forming process, more particularly to a special-purpose programmed computer system for conducting simulations of obtaining numerical physical behaviors of workpiece sheet metal during a metal forming process having a predefined load path with corresponding mesh adjustment scheme.

BACKGROUND

Sheet metal forming has been used in the industry for years for creating metal parts from a blank sheet metal, for example, automobile manufacturers and their suppliers produce many of the parts using sheet metal forming. There are many steps in sheet metal forming, one of the steps is referred to as hemming. Hems are commonly used to reinforce an edge, hide burrs and rough edges, and improve appearance. One example usage of hemming is to manufacture door panel. During a hemming process, a sheet metal edge is rolled flush to itself. In recent years, one particular type of sheet metal forming is referred to as incremental sheet metal forming. A sheet metal is formed into the final workpiece by a series of small incremental deformations. Generally, incremental sheet metal forming is conducted by connecting a forming tool to a CNC (Computer Numerical Control) machine, a robot or the likes. A load path of the forming tool is therefore predefined.

One example usage of incremental sheet metal forming is for production improvements of parts used in a prototyping or concept vehicle. Due limited quantity of the concept vehicles (sometimes one), it is impractical to create stamping tools for various parts. Incremental sheet metal forming is generally used.

With advent of computer technology, computer aided engineering analysis (e.g., time-marching simulation based on finite element analysis (FEA) technique) have been used for assisting engineers/scientists to design products and manufacturing procedures, for example, sheet metal forming process. In order to capture detailed physical behaviors in vicinity of drastic changes, finer finite element mesh is required. One prior approach is to have a finer FEA mesh for the entire model. However, this technique requires unrealistic long computation time and much larger computational resources due to huge size of the FEA mesh model. Incremental metal forming process is very a very slow procedure, to numerically simulate such as a process sometimes requires many hours of computation time. As a result, prior art approaches are not adequate. It would, therefore, be desirable to have improved methods and systems for conducting a time-marching simulation for obtaining numerical physical behaviors of sheet metal during a sheet metal forming process having a predefined load path.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Systems and methods of obtaining numerically-simulated physical behaviors of a workpiece sheet metal during a metal forming process having a predefined load path using a mesh adjustment scheme in a special-purpose programmed computer system are disclosed.

According to one aspect of the invention, a FEA mesh model is received in a special-purpose programmed computer system having a special-purpose finite element analysis (FEA) based application module installed thereon. The FEA mesh model contains a number of finite elements to represent a workpiece sheet metal in a time-marching simulation of obtaining numerical physical behaviors of the workpiece sheet metal during a metal forming process having a predefined load path (e.g., incremental metal forming, hemming, etc.). Also received in the special-purpose programmed computer system are the total simulation time period, the predefined load path, a set of mesh refinement criteria and a mesh coarsening criterion. The predefined load path contains a three-dimensional continuous path of a forming tool in the total simulation period. The set of mesh refinement criteria includes a series of predetermined mesh adjustment times during the time-marching simulation, a characteristic length for establishing a three-dimensional (3-D) mesh refinement zone and a desired mesh refinement level. The mesh coarsening criterion includes a scheme to determine respective element strain gradients of a cluster of four finite elements that share a common corner node. With the special-purpose FEA based application module, the following actions are performed: (a) setting a current simulation time to an initial value; (b) determining current simulation period from the current simulation time and a subsequent next mesh adjustment time in the series of mesh adjustment times; (c) using the characteristic length to establish the 3-D mesh refinement zone that contains a space encompassing a section of the predefined load path corresponding to the current simulation period; (d) updating the FEA mesh model by refining those finite elements deemed to be located within the 3-D mesh refinement zone to the desired mesh refinement level; (e) further updating the FEA mesh model by coarsening certain finite elements located outside of the 3-D mesh refinement zone in accordance with the mesh coarsening criterion; (f) conducting a corresponding portion of the time-marching simulation using the updated FEA mesh model for the current simulation period until the current simulation time has reached the subsequent next mesh adjustment time; and (g) repeating (b)-(f) until the current simulation time has passed the total simulation time period.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Additionally, used herein, the terms "horizontal", "vertical", "upper", "lower", "top", "bottom", "right", "left", "front", "back", "rear", "side", "middle", "upwards", and "downwards" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Embodiments of the invention are discussed herein with reference to FIGS. 1-5J. However, those skilled in the art will readily appreciate that the detailed description given herein with respect to these figures is for explanatory purposes as the invention extends beyond these limited embodiments.

Figure 1:
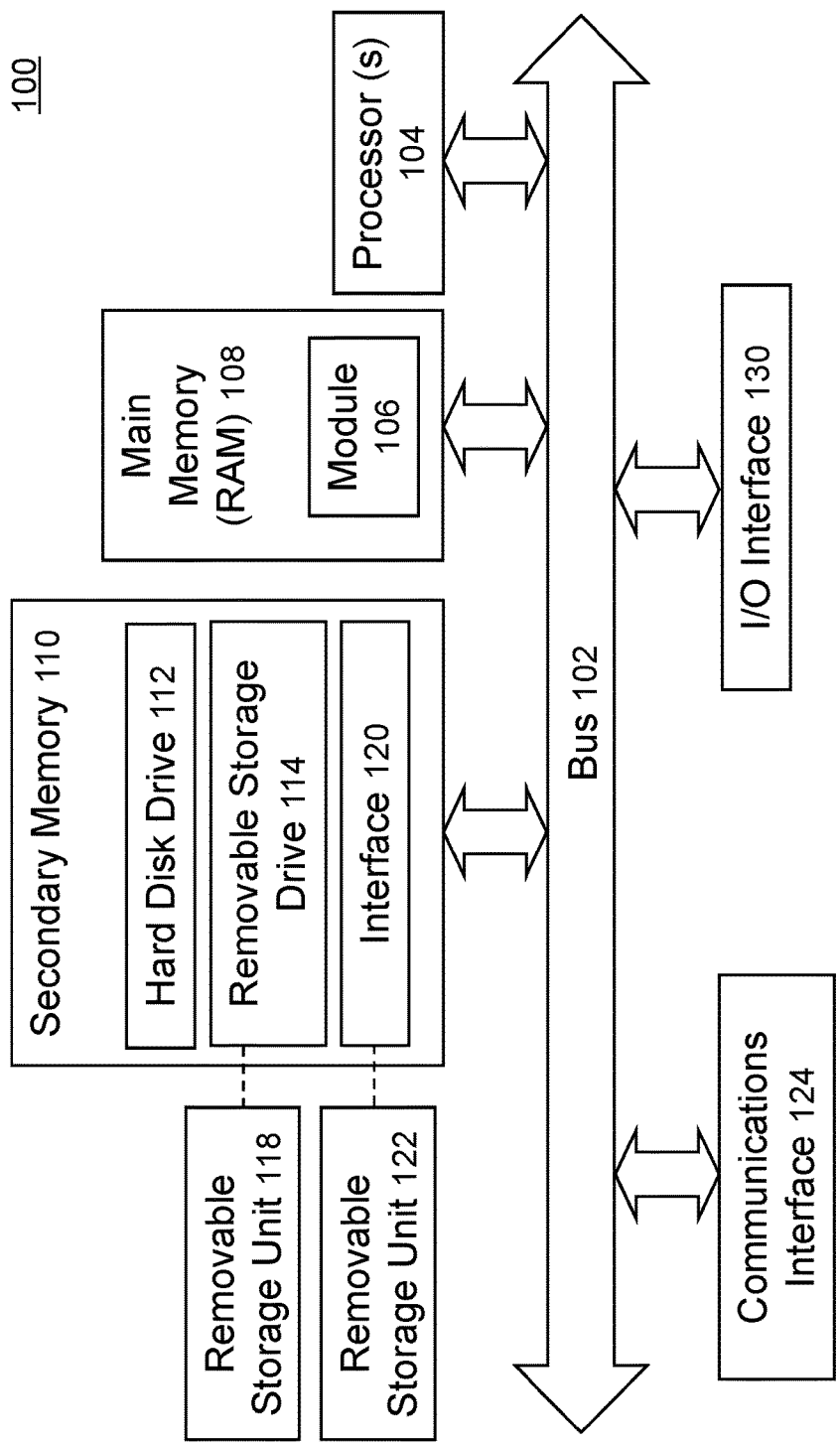
FIG. 1 is a function block diagram showing salient components of an exemplary computer, in which one embodiment of the invention may be implemented.

According to one aspect, the invention is directed towards one or more special-purpose programmed computer systems capable of carrying out the functionality described herein. An example of a computer system 100 is shown in FIG. 1. The computer system 100 includes one or more processors, such as processor 104. The processor 104 is connected to a computer system internal communication bus 102. Various software embodiments are described in terms of this exemplary computer system. After reading this description, it will become apparent to a person skilled in the relevant art(s) how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer readable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services.

There may also be a communications interface 124 connecting to the bus 102. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124. The computer 100 communicates with other computing devices over a data network based on a special set of rules (i.e., a protocol). One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100. In this document, the terms "computer program medium", "computer readable medium", "computer recordable medium" and "computer usable medium" are used to generally refer to media such as removable storage drive 114 (e.g., flash storage drive), and/or a hard disk installed in hard disk drive 112. These computer program products are means for providing software to computer system 100. The invention is directed to such computer program products.

The computer system 100 may also include an input/output (I/O) interface 130, which provides the computer system 100 to access monitor, keyboard, mouse, printer, scanner, plotter, and the likes.

Computer programs (also called computer control logic) are stored as application modules 106 in main memory 108 and/or secondary memory 110. Computer programs may also be received via communications interface 124. Such computer programs, when executed, enable the computer system 100 to perform the features of the invention as discussed herein. In particular, the computer programs, when executed, enable the processor 104 to perform features of the invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

The main memory 108 may be loaded with one or more application modules 106 that can be executed by one or more processors 104 with or without a user input through the I/O interface 130 to achieve desired tasks. In operation, when at least one processor 104 executes one of the application modules 106, the results are computed and stored in the secondary memory 110 (i.e., hard disk drive 112). Results of the analysis (e.g., updated FEA mesh model after mesh refinement) are reported to the user via the I/O interface 130 either in a text or in a graphical representation upon user's instructions.

Figure 2A:
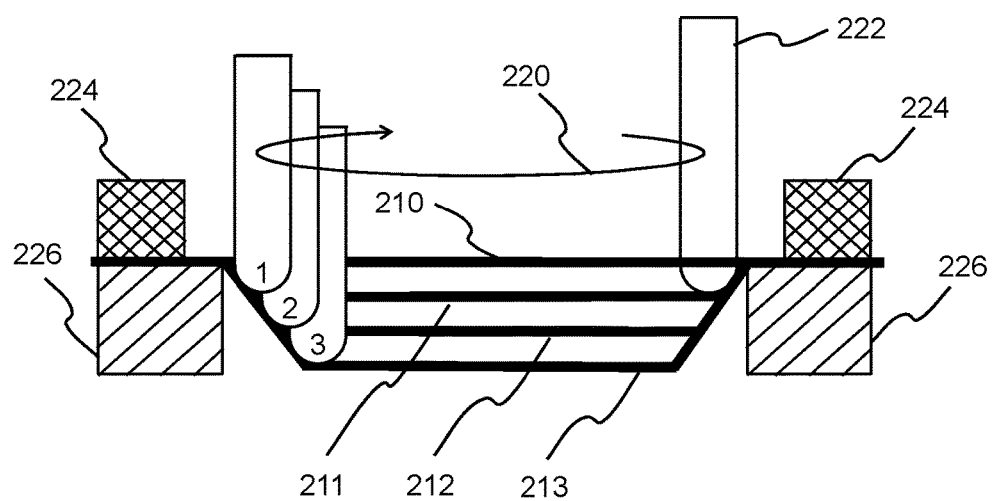
FIG. 2A is an elevation view showing an example incremental metal forming process, numerically-simulated physical behaviors of the workpiece sheet metal within which can be obtained in a specially-programmed system according to an embodiment of the invention.
Figure 2B:
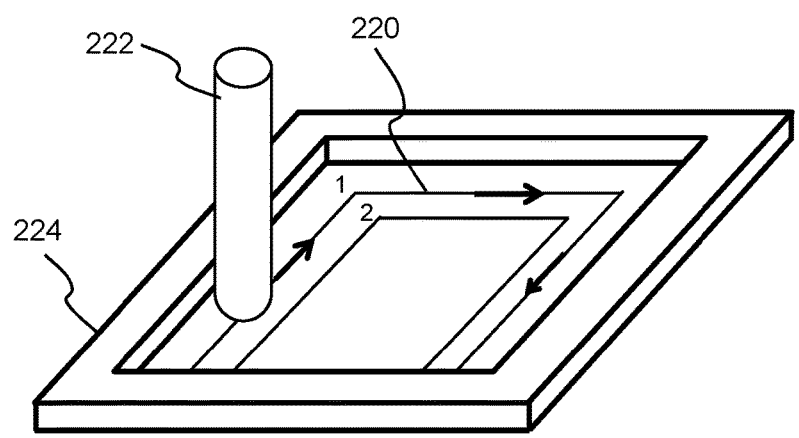
FIG. 2B is a perspective view showing the example incremental metal forming process shown in FIG. 2A.

FIG. 2A is an elevation view showing an example incremental metal forming process, numerically-simulated physical behaviors of the workpiece sheet metal within which can be obtained in a specially-programmed system according to an embodiment of the invention. FIG. 2B is a perspective view of the example incremental metal forming process shown in FIG. 2A. A workpiece sheet metal 210 having an initial flat shape is held down by a clamp 224 on a support 226. A forming tool 230 is used for incrementally forming the workpiece sheet metal via a predetermined load path 220. Tool 230 is shown have three stages indicated by numerals 1, 2 and 3 on the left side. Corresponding deformed shapes 211-213 of the workpiece sheet metal 210 are shown.

Figure 3:
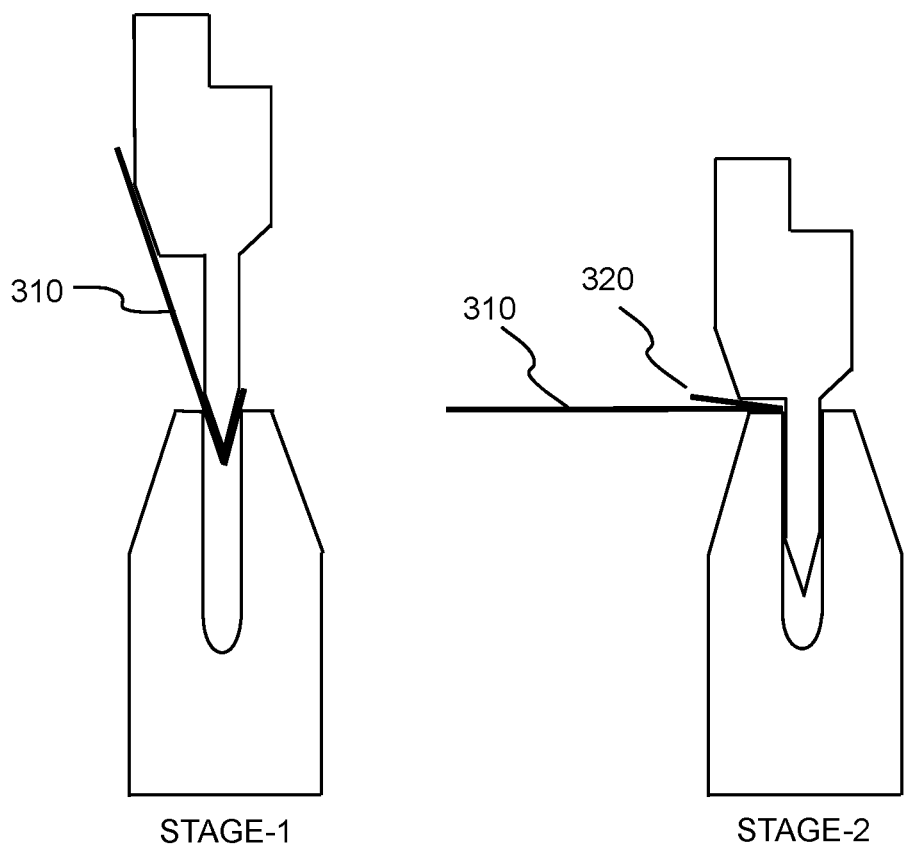
FIG. 3 is an elevation view showing an example two-stage hemming process, numerically-simulated physical behaviors of the workpiece sheet metal within which can be obtained in a specially-programmed system according to an embodiment of the invention.

FIG. 3 is an elevation view showing an example incremental metal forming process, numerically-simulated physical behaviors of the workpiece sheet metal within which can be obtained in a specially-programmed system according to an embodiment of the invention. A workpiece metal 310 is bent to a predetermined shape in STAGE-1. Then the workpiece metal 310 is pushed down to form a hem 320 in STAGE-2. Since the operations of STAGE-1 and STAGE-2 are known before the hemming process, the load path of hemming process is predefined. For illustration clarity, gaps are shown between tools and the workpiece metal 310. In reality, no gap exists between the tools and the workpiece metal 310.

Figure 4A:
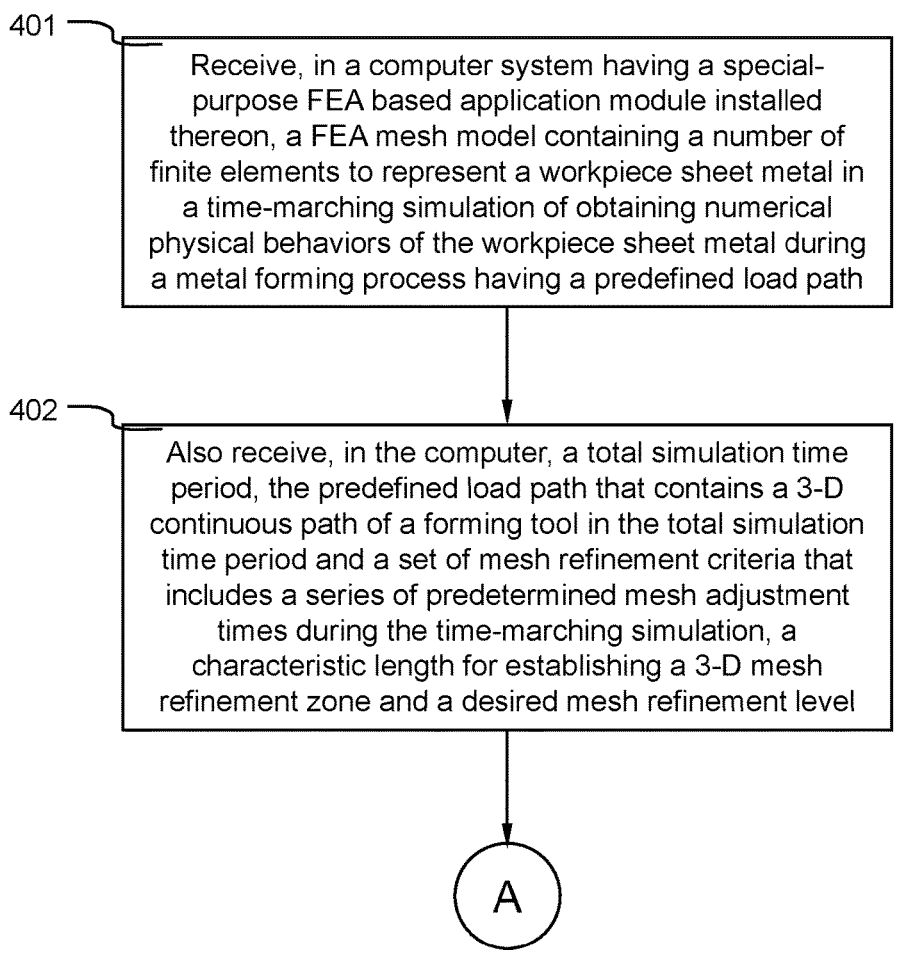
FIGS. 4A-4B collectively are a flowchart illustrating an example process of obtaining numerically-simulated physical behaviors of a workpiece sheet metal during a metal forming process having a predefined load path in a special-purpose programmed computer system, according to an embodiment of the invention.
Figure 4B:
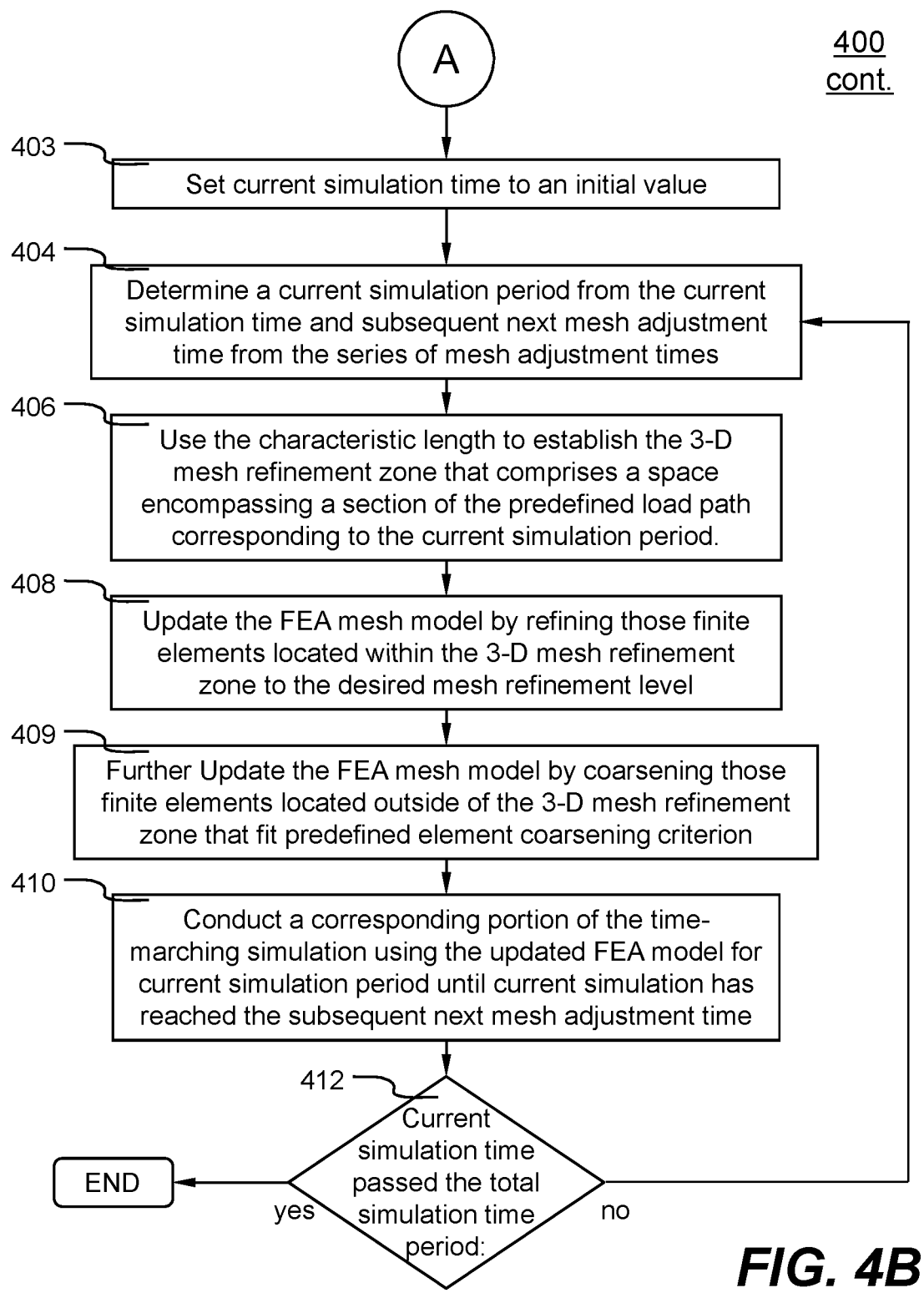

Referring to FIGS. 4A-4B, it collectively shows a flowchart illustrating an example process 400 of obtaining numerically-simulated physical behaviors of a workpiece sheet metal during a metal forming process having a predefined load path in a special-purpose programmed computer system, according to one embodiment of the invention. Process 400 is preferably implemented as special-purpose FEA based software in a special-purpose programmed computer system.

Process 400 starts at action 401 by receiving a finite element analysis (FEA) mesh model in a special-purpose programmed computer system (e.g., computer system 100 of FIG. 1) having at least one special-purpose FEA based application module installed thereon. The FEA mesh model contains a number of finite elements (e.g., two-dimensional quadrilateral shell elements) to represent a workpiece sheet metal, which is initially flat in general (i.e., referred to as a blank in a metal forming process). The FEA mesh model is used in a time-marching simulation of obtaining numerical physical behaviors of the workpiece sheet metal during a metal forming process having a predefined load path (i.e., incremental sheet metal forming, hemming, etc.).

Next, at action 402, a total simulation time period, the predefined load path and a set of mesh refinement criteria are also received in the computer system. The predefined load path contains a three-dimensional (3-D) continuous path of a forming tool (e.g., a punch) in the total simulation time period. The total simulation time period may correspond to the time required to perform the task (e.g., hemming, incremental forming, etc.) in a real world forming process. The set of mesh refinement criteria includes a series of mesh adjustment times during the time-marching simulation, a characteristic length for establishing a three-dimensional (3-D) mesh refinement zone, and a desired mesh refinement level.

Referring now to FIG. 4B, all actions of process 400 therein are performed with the special-purpose FEA based application module. At action 403, current simulation time is set to an initial value, which is generally zero. At action 404, a current simulation period is determined from the current simulation time and the subsequent next mesh adjustment time from the series of mesh adjustment times.

Then, at action 406, a 3-D mesh refinement zone is established using the characteristic length. The 3-D mesh refinement zone comprises a space encompassing the corresponding section of the predefined load path of the current simulation period. At action 408, the FEA mesh model is updated by refining those finite elements deemed to be located within the 3-D mesh refinement zone to the desired mesh refinement level. At action 409, the FEA mesh model is further updated by coarsening certain finite elements located outside of the 3-D mesh refinement zone in accordance with a predefined mesh coarsening criterion. In one embodiment, mesh coarsening criterion is used for determining respective strain gradients of a cluster of four finite elements that share a common corner node. Updating the finite element mesh model requires mapping of the element states (e.g., stress, strain, etc.) from the original model to the updated model. The mapping of the element states can be done with a number of well-known procedures.

At action 410, a corresponding portion of the time-marching simulation is conducted using the updated FEA mesh model for the current simulation time period until the current simulation time has reached the subsequent next mesh adjustment time. Next, at test 412, it is determined whether the current simulation time has passed the total simulation time period. If test 412 is false, process 400 follows the 'no' branch to action 404 to repeat actions 404, 406, 408 and 410 until the test 412 becomes true. Process 400 ends thereafter.

Figure 5A:
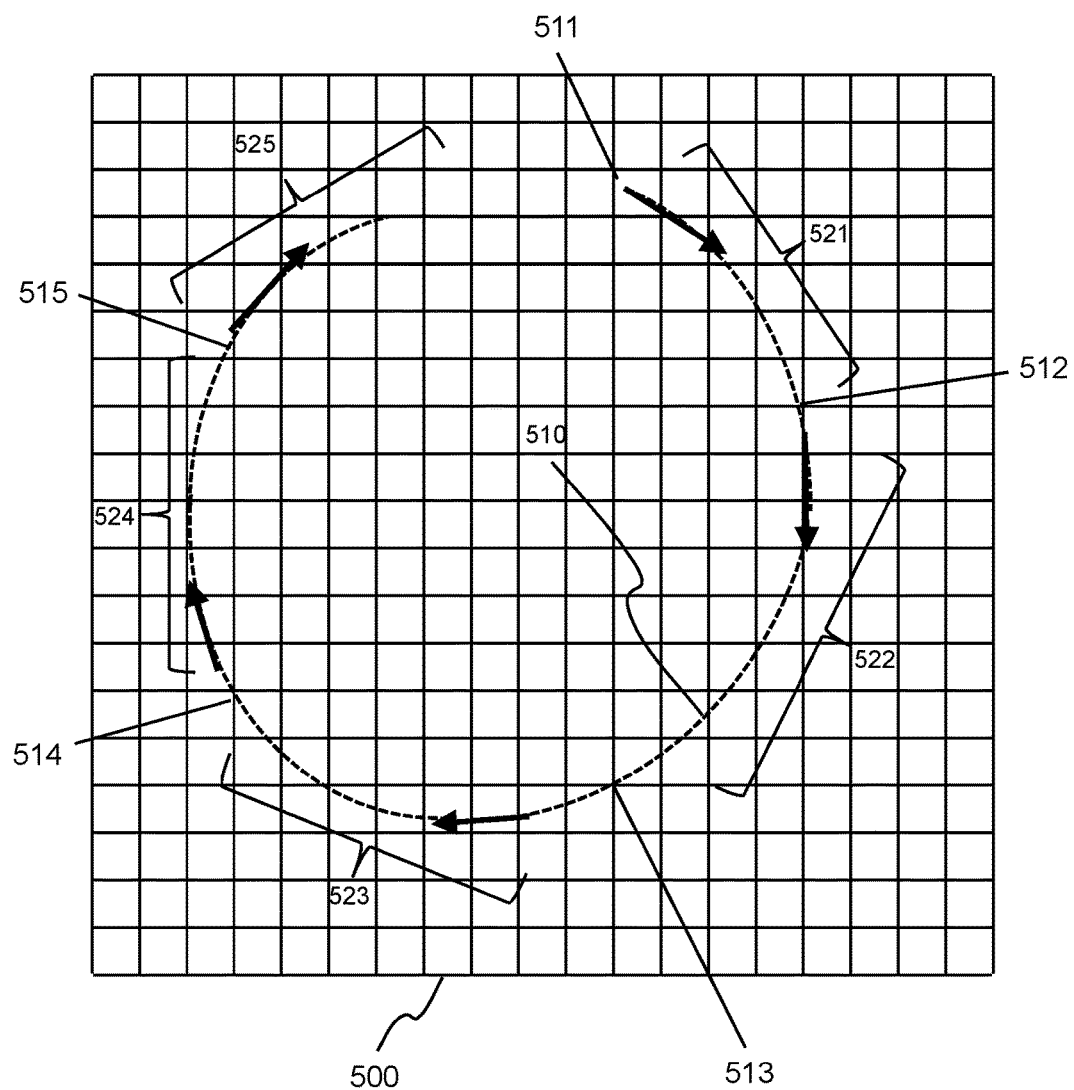
FIG. 5A is a plan view showing an example FEA mesh model representing a workpiece sheet metal having a predefined load path imposed thereon, according to an embodiment of the invention.

FIG. 5A is a plane view of an example FEA mesh model 500 with a predefined partial load path 510 imposed thereon. In this example, FEA mesh model 500 contains a number of shell elements to represent a workpiece sheet metal. Although FEA mesh model 500 comprises a square shape workpiece sheet metal, the workpiece sheet metal can be any other arbitrary shapes, for example, shape of a door panel of a car. The predefined partial load path 510 (shown with broken line) can have arbitrary path instead of the approximated circular path shown. The predefined load path 510 starts initially at a starting point 511, which corresponds to the initial simulation time. The initial current simulation time is generally set to zero. Arrows overlapped the predefined load path 510 indicate the direction of the load or a forming tool. In other words, forming tool starts at the starting point 511 and then follows the direction of the arrows along the predefined load path 510 to an end point (not shown), which corresponds to the end of the total simulation time period. For example, the initial point 511 corresponds to the beginning of the time-marching simulation, while point 512 corresponds to the subsequent next mesh adjustment time. Points 511 and 512 define section 521 corresponding to the current simulation period. Points 512 and 513 define section 522 corresponding to the next simulation period, and so on. Each of the points 511-515 corresponds to mesh adjustment times defined in the mesh refinement criteria.

The predefined load path 510 is partitioned to a number of sections (e.g., sections 521-525 are shown) with the series of mesh adjustment times. In other words, each mesh adjustment time and its subsequent mesh adjustment time define a section. The series of predetermined mesh adjustment times can be defined with many well known techniques, for example, equally dividing the entire predefined load path, different times defined by a user of the time-marching simulation, etc.

Figure 5B:
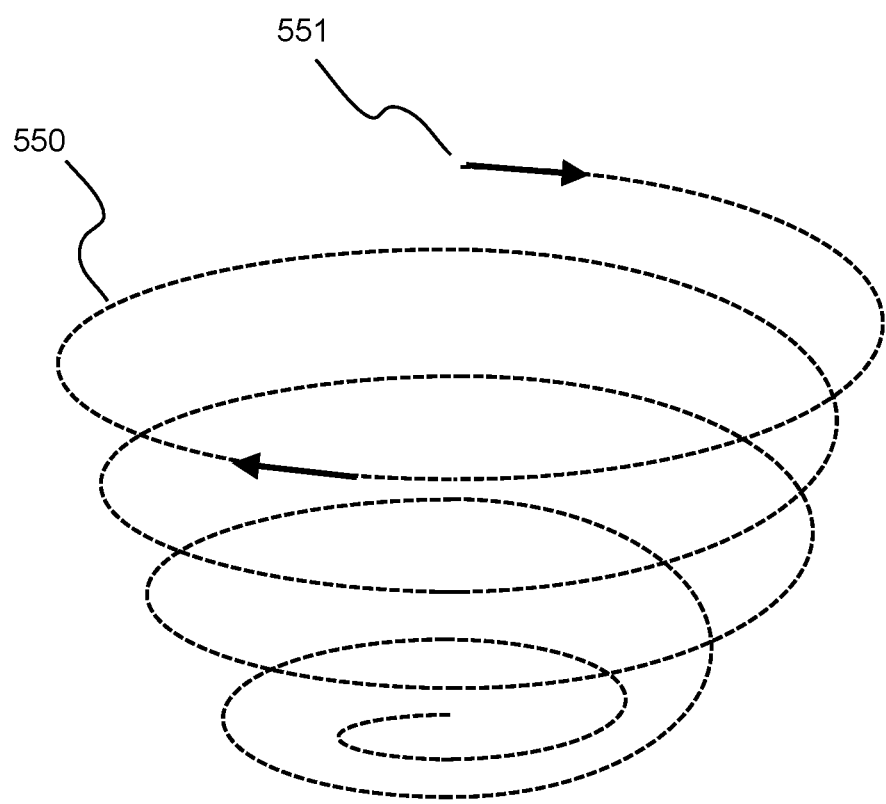
FIG. 5B is a perspective view showing a predefined load path, according to an embodiment of the invention.

The predefined load path 510 is an arbitrary path in three-dimension. FIG. 5B is a perspective view showing an example predefined load path as a 3-D continuous path 550 starting at initial point 551.

Figure 5C:
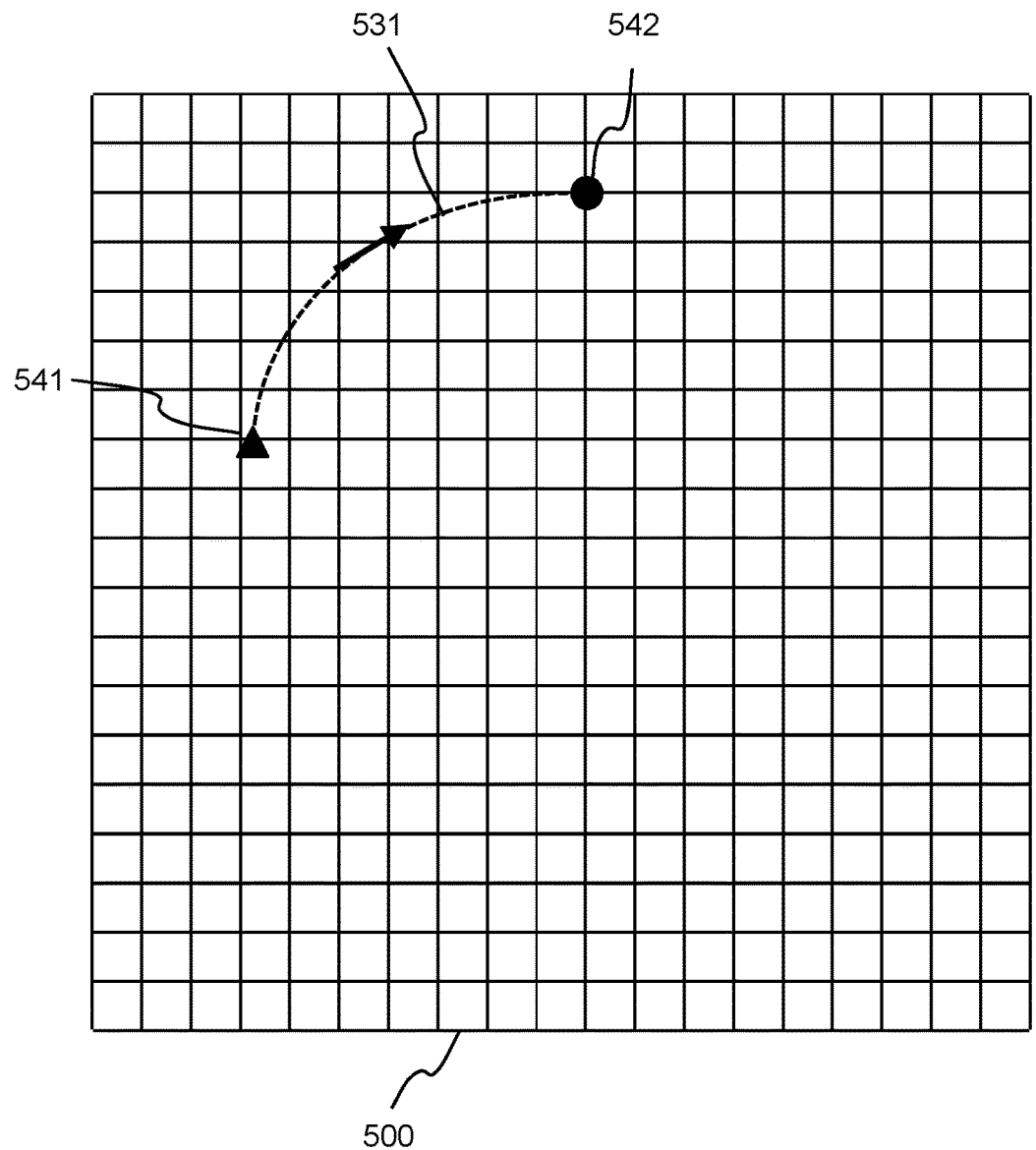
FIG. 5C is a diagram showing the example FEA mesh model of FIG. 5A with a section of the predefined load path corresponding to current simulation period, according to an embodiment of the invention.

FIG. 5C is a diagram showing the example FEA mesh model 500 of FIG. 5A with a section of the predefined load path 531 corresponding to a current simulation period. The section of the predefined load path 531 is between a first location 541 corresponding to the current simulation time and a second location 542 corresponding to the subsequent next mesh adjustment time.

Figure 5D:
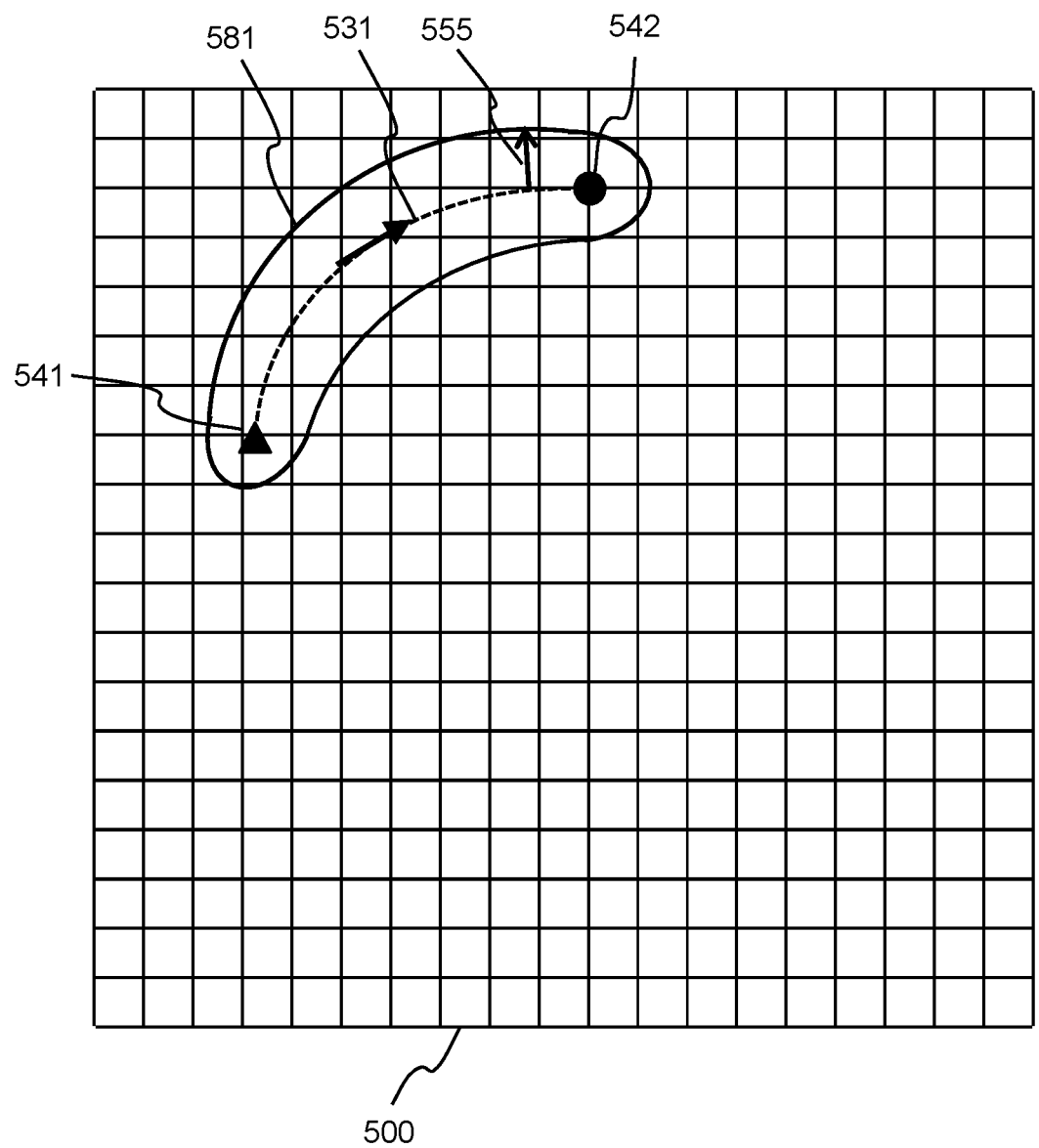
FIG. 5D is a diagram showing an example 3-D mesh refinement zone encompassing the section of the predefined load path shown in FIG. 5C, according to an embodiment of the invention.

FIG. 5D is a diagram showing an example 3-D mesh refinement zone 581 encompassing the section of the predefined load path 531 shown in FIG. 5C. The example 3-D mesh refinement zone 581 is established using a characteristic length 555 as a radius to form a tube volume along the section of the predefined load path 531 with two semi-spheres each at the either end of the tube.

Figure 5E:
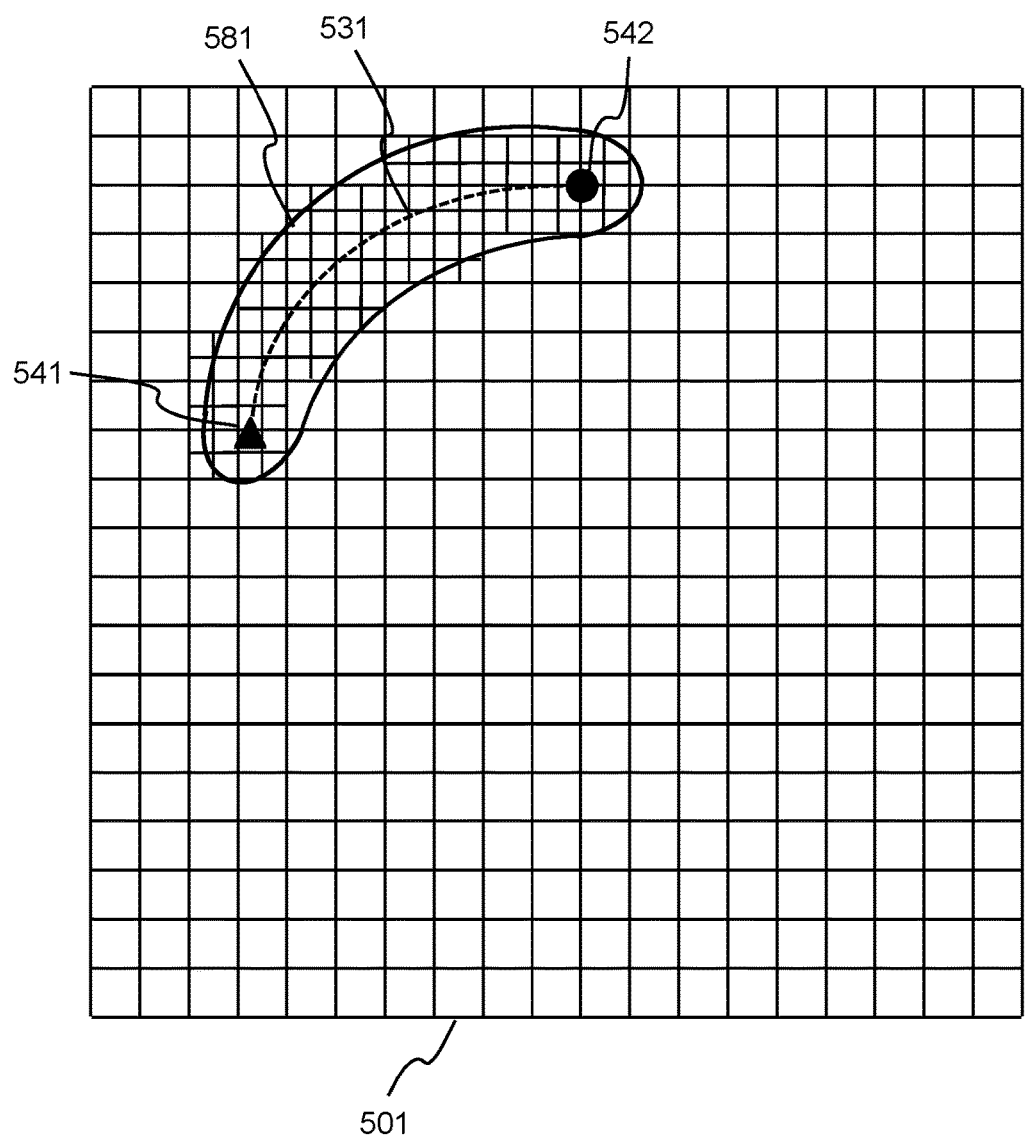
FIG. 5E is a diagram showing a first example updated FEA mesh model with refined finite elements in the example 3-D mesh refinement zone using a first mesh refinement criterion in accordance with one embodiment of the invention.
Figure 5F:
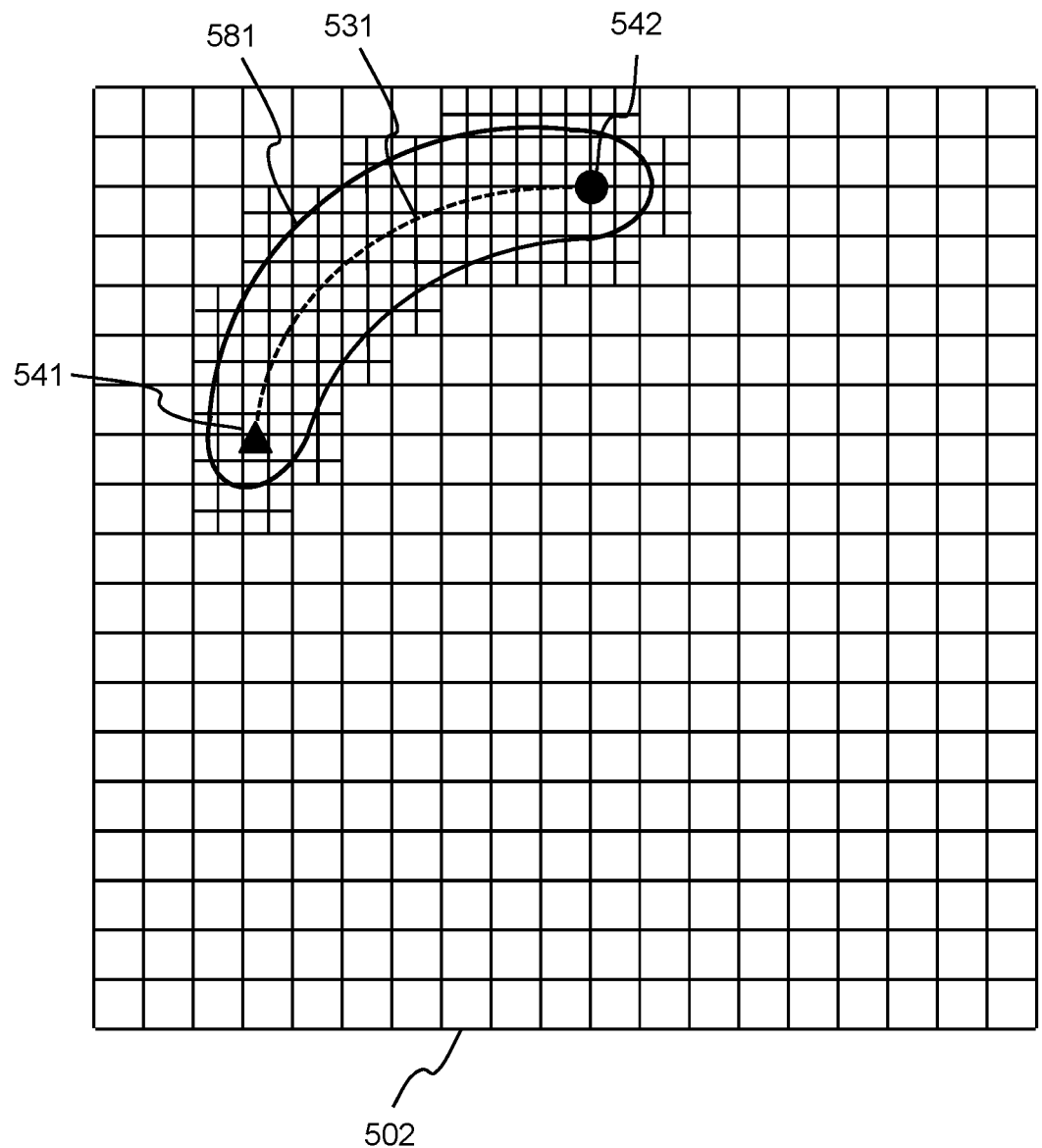
FIG. 5F is a diagram showing a second example updated FEA mesh model with refined finite elements in the example 3-D mesh refinement zone using another mesh refinement criterion in accordance with one embodiment of the invention.

FIG. 5E is a diagram showing a first example updated FEA mesh model 501 with refined finite elements in the example 3-D mesh refinement zone 581 using a first mesh refinement criterion. The first mesh refinement criterion is to refine those finite elements having respective centroids within the example 3-D mesh refinement zone 581. FIG. 5F is a diagram showing a second example updated FEA mesh model 502 with refined finite elements in the example 3-D mesh refinement zone 581 using a second mesh refinement criterion. The second mesh refinement criterion is to refine those finite elements having any part within the example 3-D mesh refinement zone 581.

Refined finite elements shown in both example FEA mesh models 501-502 are for illustration purpose only. Desired mesh refinement level may require additional refinement to a finer mesh (not shown).

Figure 5G:
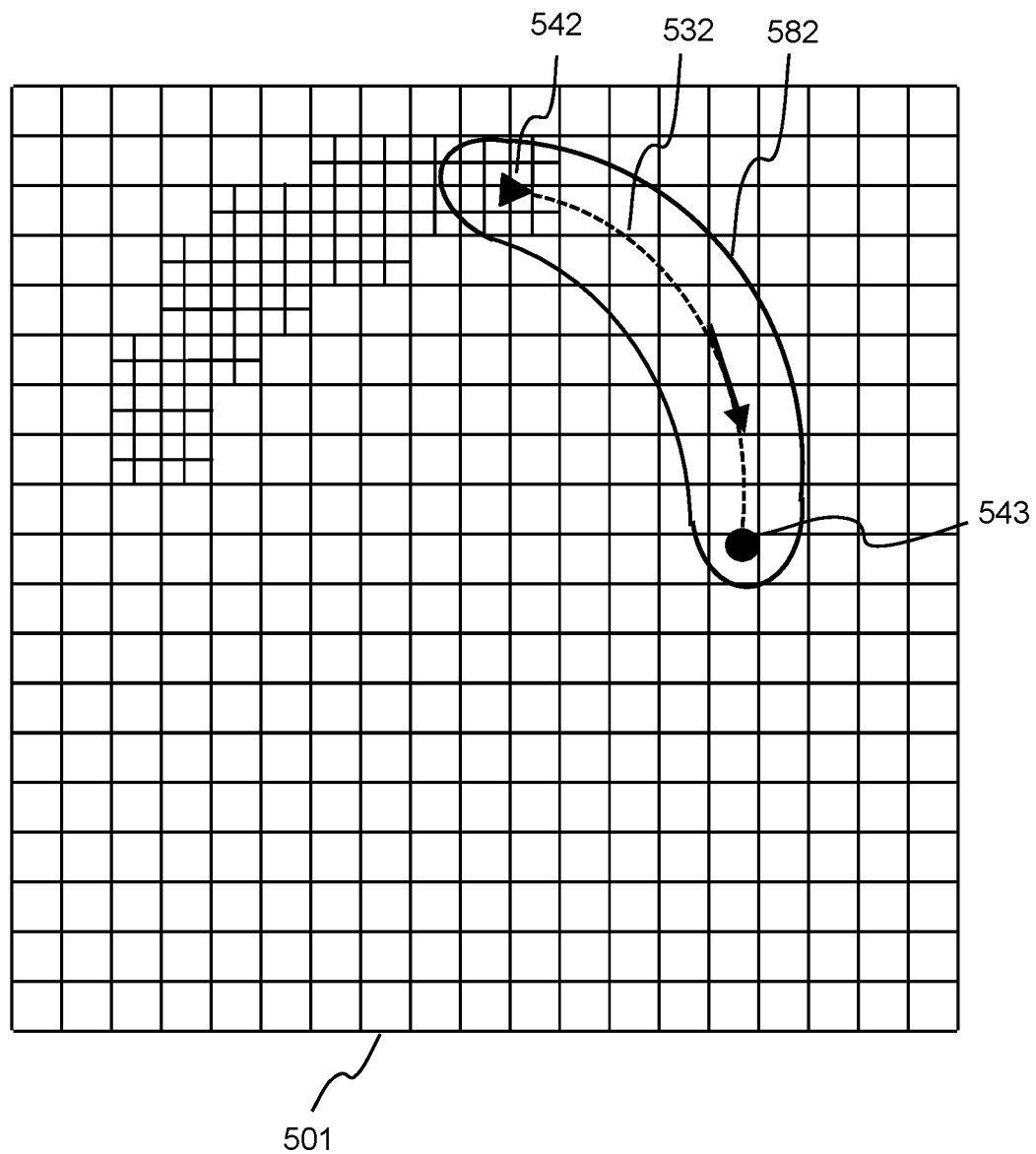
FIG. 5G is a diagram showing the FEA mesh model of FIG. 5E with another corresponding section of the predefined load path for the next simulation period of the current simulation period in FIG. 5C, according to an embodiment of the invention.
Figure 5H:
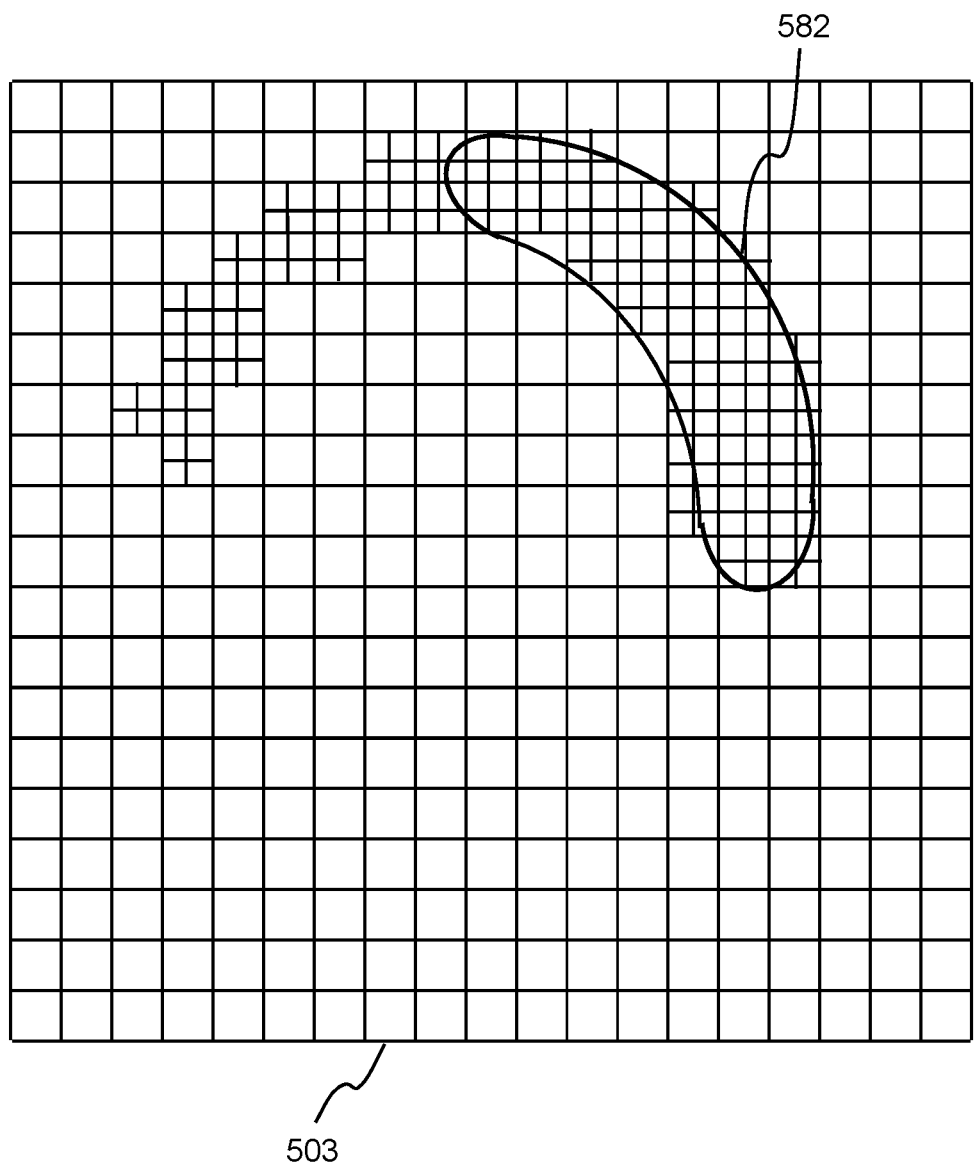
FIG. 5H is a diagram showing a result of mesh refinement of the FEA mesh model of FIG. 5G, according to an embodiment of the invention.

FIG. 5G is a diagram showing the example FEA mesh model 501 of FIG. 5E with another corresponding section of the predefined load path 532 for the next simulation period of the current simulation period in FIG. 5C. The next simulation period is defined by a starting location 542 corresponding to the current simulation time and an ending location 543 corresponding to the subsequent next mesh adjustment time. Another 3-D mesh refinement zone 582 is established to encompass the corresponding section of the predefined load path 532. Finite elements deemed to be located within the 3-D mesh refinement zone 582 are then refined to the desired refinement level accordingly. And certain finite elements located outside of the 3-D mesh refinement zone are coarsened in accordance with a mesh coarsening criterion, which is for determining respective strain gradients of a cluster of four finite elements that share a common corner node. It is noted the some of the finite elements have already been refined near the starting location 542. As a result, the updated FEA mesh model 503 is shown in FIG. 5H. A current 3-D mesh refinement zone 582 is drawn on top of the updated FEA mesh model 503. Also shown in FIG. 5H, certain finite elements outside of the 3-D mesh refinement zone 582 are coarsened in accordance with the mesh coarsening criterion.

Figure 5I:
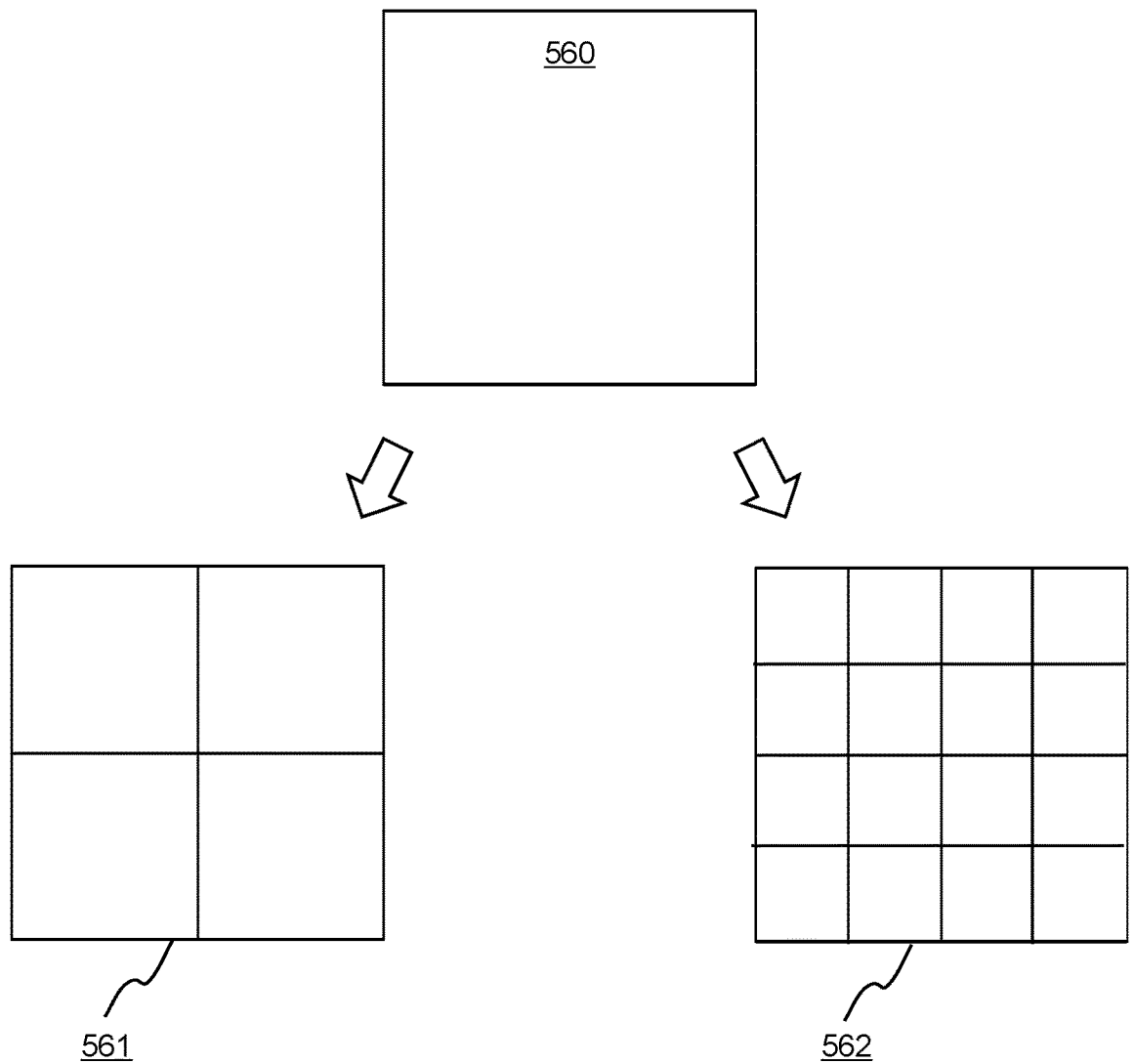
FIG. 5I is a diagram showing example mesh refinement levels in accordance with one embodiment of the invention.

FIG. 5I shows two example desired mesh refinement levels. In one embodiment, an example finite element 560 is refined once to four one-level refined finite elements 561. In another embodiment, the example finite element 560 is refined twice to sixteen two-level refined finite elements 562.

Figure 5J:
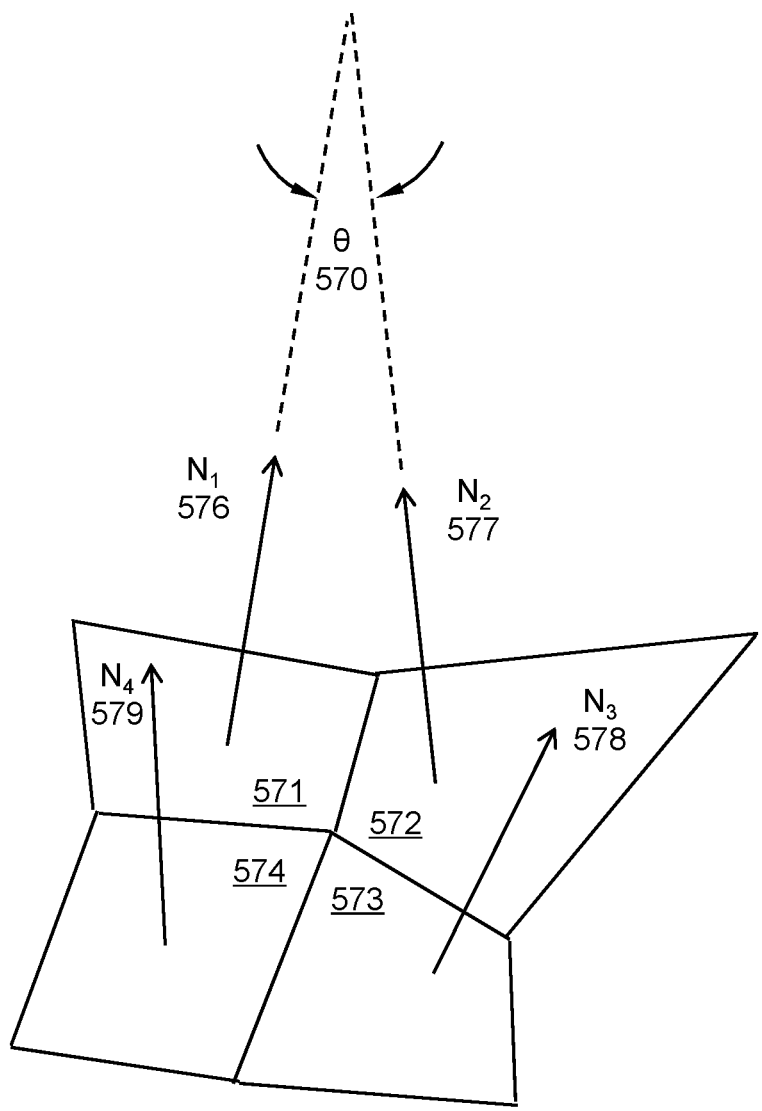
FIG. 5J is a diagram showing an example cluster of four finite elements that share one common corner node for demonstrate an example mesh coarsening criterion in accordance with one embodiment of the invention.

FIG. 5J is a diagram showing a cluster of four finite elements 571-574 that share a common corner node for demonstrating an example mesh coarsening criterion in accordance with one embodiment of the invention. For example the cluster of four finite elements 571-574 are located outside of the 3-D mesh refinement zone (i.e., the area outside of the 3-D mesh refinement zone 582 of FIG. 5H). Finite elements 571-574 have element normal vectors $N_1$-$N_4$ 576-579, respectively. Element normal vector is a normal vector perpendicular to the finite element at its centroid.

A mesh coarsening criterion is used for determining whether these four finite elements 571-574 can be coarsened back to one finite element. For example, relative angle between any two of the four normal vectors 576-579 must be within a threshold value (e.g., two degrees). In this example, relative angle θ 570 is between element normal vectors $N_1$ 576 and $N_2$ 577.

Although the invention has been described with reference to specific embodiments thereof, these embodiments are merely illustrative, and not restrictive of, the invention. Various modifications or changes to the specifically disclosed exemplary embodiments will be suggested to persons skilled in the art. Whereas most of the illustrations are shown in two-dimension, the invention comprises a predefined load path in three-dimension. Additionally, whereas only few points are shown in FIG. 5A to demonstrate the series of mesh adjustment times, the invention does not set limit to how many mesh adjustment times, for example, ten points. Moreover, whereas 3-D mesh refinement zone has been shown and described as a space with a tube with semi-spherical ends, other shapes can be used for establishing the 3-D mesh refinement zone to achieve the same, for example, a prism. Furthermore, whereas two example mesh refinement levels have been shown and described, other levels may be used for achieving the same. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A special-purpose programmed computer system for obtaining numerically-simulated physical behaviors of a workpiece sheet metal during a metal forming process having a predefined load path comprises:
   an input/output (I/O) interface;
   a memory for storing computer readable code for a special-purpose finite element analysis (FEA) based application module;
   at least one processor coupled to the memory, said at least one processor executing the computer readable code in the memory to cause the special-purpose FEA based application module to perform operations of:
   receiving a FEA mesh model containing a plurality of finite elements to represent a workpiece sheet metal in a time-marching simulation of obtaining numerical physical behaviors of the workpiece sheet metal during a metal forming process having a predefined load path, whereby the obtained numerical physical behaviors are used for production improvements of parts used in a prototype or concept vehicle;
   further receiving a total simulation time period, the predefined load path that contains a three-dimensional continuous path of a forming tool in the total simulation period, a set of mesh refinement criteria and a mesh coarsening criterion, the set of mesh refinement criteria includes a series of predetermined mesh adjustment times during the time-marching simulation, a characteristic length for establishing a three-dimensional (3-D) mesh refinement zone and a desired mesh refinement level;
   (a) setting a current simulation time to an initial value;
   (b) determining a current simulation period from the current simulation time and a subsequent next mesh adjustment time in the series of mesh adjustment times;
   (c) using the characteristic length to establish the 3-D mesh refinement zone that contains a space encompassing a section of the predefined load path corresponding to the current simulation period;
   (d) updating the FEA mesh model by refining those finite elements deemed to be located within the 3-D mesh refinement zone to the desired mesh refinement level;
   (e) further updating the FEA mesh model by coarsening certain finite elements located outside of the 3-D mesh refinement zone in accordance with the mesh coarsening criterion;
   (f) conducting a corresponding portion of the time-marching simulation using the updated FEA mesh model for the current simulation period until the current simulation time has reached the subsequent next mesh adjustment time; and
   (g) repeating (b)-(f) until the current simulation time has passed the total simulation time period.

2. The special-purpose programmed computer system of claim 1, wherein the plurality of finite elements comprises two-dimensional shell element.

3. The special-purpose programmed computer system of claim 1, wherein the metal forming process having the predefined load path comprises an incremental sheet metal forming or hemming.

4. The special-purpose programmed computer system of claim 1, wherein the space surrounding the corresponding section of the predefined load path comprises a three-dimensional tube with a semi-sphere at either end of the tube.

5. The special-purpose programmed computer system of claim 4, wherein the tube is centered along the corresponding section of the predefined load path.

6. The special-purpose programmed computer system of claim 4, wherein both the tube and the semi-sphere have a radius equal to the characteristic length.

7. The special-purpose programmed computer system of claim 1, wherein said those finite elements deemed to be located within the 3-D mesh refinement zone are determined using respective centroids of said those finite elements.

8. The special-purpose programmed computer system of claim 1, wherein said those finite elements deemed to be located within the 3-D mesh refinement zone are determined using respective corners of said those finite elements.

9. The special-purpose programmed computer system of claim 1, wherein the mesh coarsening criterion is used for determining respective element strain gradients of a cluster of four finite elements that share a common corner node.

10. A non-transitory computer readable medium containing instructions for obtaining numerically-simulated physical behaviors of a workpiece sheet metal during a metal forming process having a predefined load path by a method comprises:

receiving, in a special-purpose programmed computer system having a special-purpose finite element analysis (FEA) based application module installed thereon, a FEA mesh model containing a plurality of finite elements to represent a workpiece sheet metal in a time-marching simulation of obtaining numerical physical behaviors of the workpiece sheet metal during a metal forming process having a predefined load path, whereby the obtained numerical physical behaviors are used for production improvements of parts used in a prototype or concept vehicle;

further receiving, in the special-purpose programmed computer system, a total simulation time period, the predefined load path that contains a three-dimensional continuous path of a forming tool in the total simulation period, a set of mesh refinement criteria and a mesh coarsening criterion, the set of mesh refinement criteria includes a series of predetermined mesh adjustment times during the time-marching simulation, a characteristic length for establishing a three-dimensional (3-D) mesh refinement zone and a desired mesh refinement level;

with the special-purpose FEA based application module, (a) setting, with the special-purpose FEA based application module, a current simulation time to an initial value;

(b) determining, with the special-purpose FEA based application module, a current simulation period from the current simulation time and a subsequent next mesh adjustment time in the series of mesh adjustment times;

(c) using, with the special-purpose FEA based application module, the characteristic length to establish the 3-D mesh refinement zone that contains a space encompassing a section of the predefined load path corresponding to the current simulation period;

(d) updating, with the special-purpose FEA based application module, the FEA mesh model by refining those finite elements deemed to be located within the 3-D mesh refinement zone to the desired mesh refinement level;

(e) further updating the FEA mesh model by coarsening certain finite elements located outside of the 3-D mesh refinement zone in accordance with the mesh coarsening criterion;

(f) conducting, with the special-purpose FEA based application module, a corresponding portion of the time-marching simulation using the updated FEA mesh model for the current simulation period until the current simulation time has reached the subsequent next mesh adjustment time; and (g) repeating, with the special-purpose FEA based application module, (b)-(f) until the current simulation time has passed the total simulation time period.

11. The non-transitory computer readable medium of claim 10, wherein the plurality of finite elements comprises two-dimensional shell element.

12. The non-transitory computer readable medium of claim 10, wherein the metal forming process having the predefined load path comprises an incremental sheet metal forming or hemming.

13. The non-transitory computer readable medium of claim 10, wherein the space surrounding the corresponding section of the predefined load path comprises a three-dimensional tube with a semi-sphere at either end of the tube.

14. The non-transitory computer readable medium of claim 13, wherein the tube is centered along the corresponding section of the predefined load path.

15. The non-transitory computer readable medium of claim 13, wherein both the tube and the semi-sphere have a radius equal to the characteristic length.

16. The non-transitory computer readable medium of claim 10, wherein said those finite elements deemed to be located within the 3-D mesh refinement zone are determined using respective centroids of said those finite elements.

17. The non-transitory computer readable medium of claim 10, wherein said those finite elements deemed to be located within the 3-D mesh refinement zone are determined using respective corners of said those finite elements.

18. The non-transitory computer readable medium of claim 10, wherein the mesh coarsening criterion is used for determining respective element strain gradients of a cluster of four finite elements that share a common corner node.

* * * * *